United States Patent
Bryant et al.

(10) Patent No.: US 9,928,096 B2
(45) Date of Patent: *Mar. 27, 2018

(54) PREVENTING INTEROPERABILITY CONFLICTS IN A SHARED COMPUTING ENVIRONMENT

(71) Applicant: International Business Machines Corporation, Armonk, NY (US)

(72) Inventors: Jay S. Bryant, Rochester, MN (US); Bin Cao, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,496

(22) Filed: Jun. 11, 2015

(65) Prior Publication Data
US 2016/0315873 A1 Oct. 27, 2016

Related U.S. Application Data

(63) Continuation of application No. 14/695,183, filed on Apr. 24, 2015.

(51) Int. Cl.
G06F 9/455 (2006.01)
H04L 29/08 (2006.01)
H04L 12/911 (2013.01)

(52) U.S. Cl.
CPC ........ G06F 9/45558 (2013.01); H04L 47/781 (2013.01); H04L 67/10 (2013.01);
(Continued)

(58) Field of Classification Search
None
See application file for complete search history.

(56) References Cited

U.S. PATENT DOCUMENTS

2013/0055245 A1* 2/2013 Tsirkin .................... G06F 9/545 718/1
2013/0298184 A1* 11/2013 Ermagan ................. G06F 21/54 726/1

(Continued)

OTHER PUBLICATIONS

Kocoloski et al., "A Case for Dual Stack Virtualization: Consolidating HPC and Commodity Applications in the Cloud", SoCC '12 Proceedings of the Third ACM Symposium on Cloud Computing, Article No. 23., 7 pages, © 2012. DOI: 10.1145/2391229.2391252.

(Continued)

*Primary Examiner* — Sisley Kim
(74) *Attorney, Agent, or Firm* — Nathan M. Rau

(57) ABSTRACT

A hypervisor can handle requests from applications in a processing environment, where the processing environment consists of shared computing resources. A system can receive a request from an application, and the hypervisor can determine that the request is one that may result in poor interoperability between the application and the processing environment. The hypervisor can identify a processing solution that is more compatible, and it can fulfill the request using the more compatible option. However, the hypervisor need not alert the application of the modified execution; rather, the hypervisor can communicate to the application that the request has been fulfilled.

9 Claims, 5 Drawing Sheets

(52) U.S. Cl.
CPC ............... *G06F 2009/4557* (2013.01); *G06F 2009/45595* (2013.01)

(56) References Cited

U.S. PATENT DOCUMENTS

| | | |
|---|---|---|
| 2014/0067864 A1 | 3/2014 | Holland et al. |
| 2014/0215272 A1 | 7/2014 | Bauer et al. |
| 2014/0245299 A1* | 8/2014 | Yadappanavar .... G06F 9/45533 718/1 |
| 2014/0282573 A1 | 9/2014 | Clark et al. |
| 2015/0163158 A1* | 6/2015 | Ryland .................... H04L 47/70 709/225 |
| 2016/0043968 A1* | 2/2016 | Jacob .................... H04L 47/808 709/226 |
| 2016/0043969 A1* | 2/2016 | Sung .................... H04L 47/825 370/392 |

OTHER PUBLICATIONS

Mell et al., "The NIST Definition of Cloud Computing," National Institute of Standards and Technology, U.S. Department of Commerce, Special Publication 800-145, 7 pages, Sep. 2011.

Bryant et al., "Preventing Interoperability Conflicts in a Shared Computing Environment", U.S. Appl. No. 14/695,183, filed Apr. 24, 2015.

List of IBM Patents or Patent Applications Treated as Related.

\* cited by examiner

PREVENTING INTEROPERABILITY CONFLICTS IN A SHARED COMPUTING ENVIRONMENT

BACKGROUND

The present disclosure relates to data processing, and more specifically, to the use of hypervisors in data processing.

A hypervisor is a software layer that can control access to a physical server or host's physical hardware; it can also create and run virtual machines (VMs). There are two types of hypervisors: native or hosted. Native hypervisors can also be referred to as "bare metal" hypervisors. Native hypervisors can run directly on the host's hardware and allow multiple operating systems to run on the same physical hardware. Hosted hypervisors, however, can run on top of the host's operating system. The use of a hosted hypervisor can allow multiple additional operating system environments to run within the host's original operating system.

Cloud computing is the delivery of shared computing resources, software or data as a service. Cloud computing is built on top of a virtualized infrastructure, consisting of compute, storage, and network components.

SUMMARY

Embodiments of the present disclosure may be directed toward a computer implemented method for enabling a hypervisor to process requests from applications in a processing environment. The method may begin when a system receives a first request from a first application. The system can determine if the first request matches at least one interoperability request from the list. Each interoperability request may be associated with one processing solution. The system can then identify a processing solution, based on the interoperability request that matches the first request. The system can then fulfill the first request with the identified processing solution and communicate a confirmation of the fulfilled first request.

Embodiments of the present disclosure may be directed toward a computer system for enabling a hypervisor to process requests from applications in a processing environment. The computer system may comprise at least one processor circuit configured to receive a first request from a first application and determine that the first request matches at least one interoperability request from the list of interoperability requests. Each interoperability request can be associated with a processing solution. The circuit may also be configured to identify a processing solution based on the interoperability request that matches the first request, fulfill the first request with the identified processing solution, and communicate a confirmation of the fulfilled first request to the first application.

Embodiments of the present disclosure may be directed toward a computer program product for enabling a hypervisor to process requests from applications in a processing environment, where the computer program product may comprise a computer readable storage medium having program instructions embodied therewith, wherein the computer readable storage medium is not a transitory signal per se. The program instructions may be executable by a computer processing circuit to cause the circuit to perform the method comprising receiving a first request from a first application. The system can determine if the first request matches at least one interoperability request from the list. Each interoperability request may be associated with one processing solution. The system can then identify a processing solution, based on the interoperability request that matches the first request. The system can then fulfill the first request with the identified processing solution and communicate a confirmation of the fulfilled first request.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
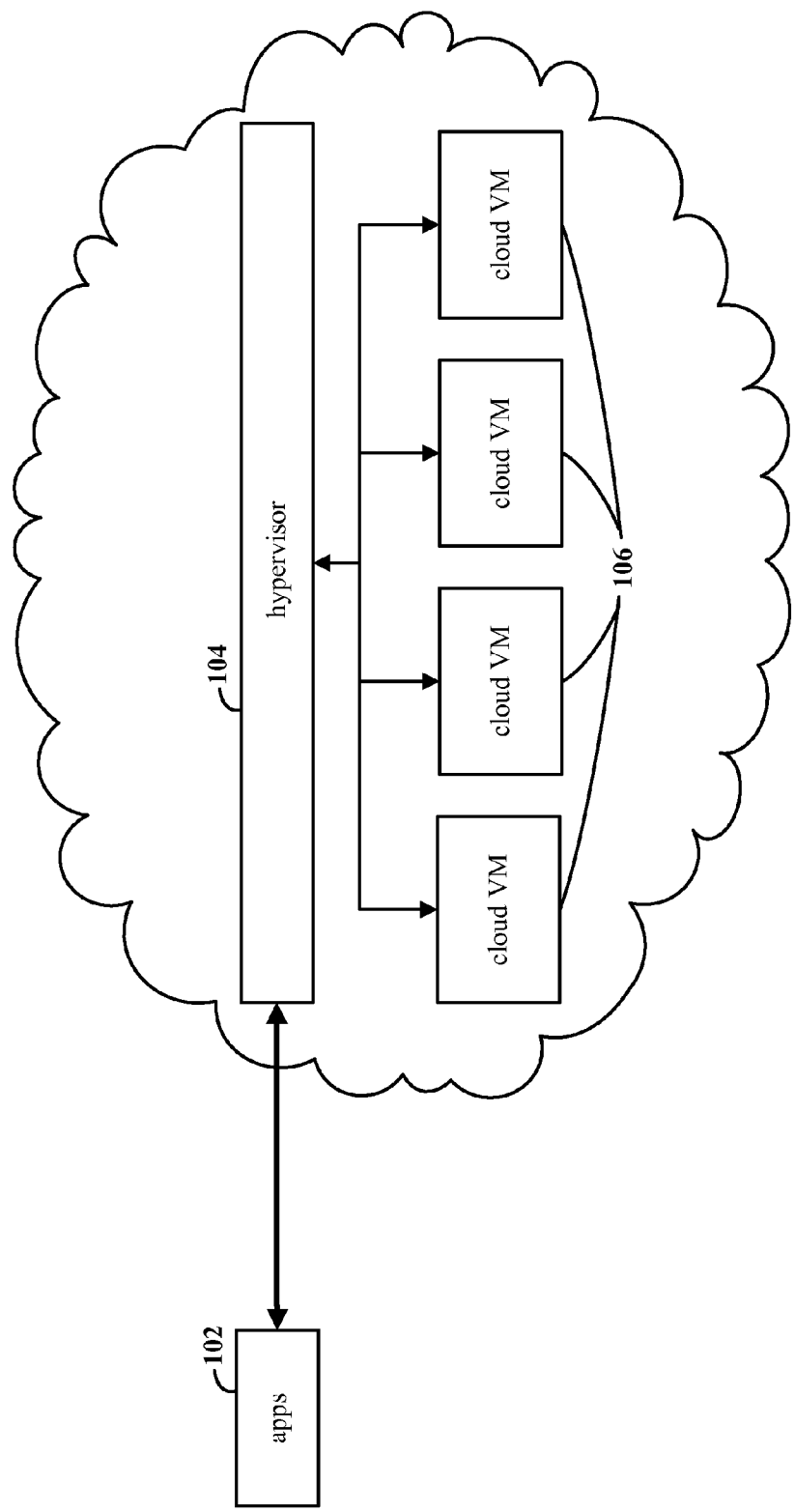
FIG. 1 depicts a system diagram for enabling a hypervisor to process requests from applications in a processing environment, specifically a cloud computing environment, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, more particular aspects relate to a hypervisor handling requests from applications. While the present disclosure is not necessarily limited to such applications, various aspects of the disclosure may be appreciated through a discussion of various examples using this context.

Applications may run in a cloud computing environment in a manner that is different from traditional desktop or High Performance Computing (HPC) environments. For example, in a cloud computing environment, computing resources can be shared by multiple users. Computing resources may also be reallocated for each request, in order to efficiently use available computing resources. This is unlike traditional HPC environments which may consist of only a single application running at a time on heterogeneous hardware configurations.

Applications may be developed without a knowledge of the environment (e.g. HPC or cloud) in which the application may run. The application may also be developed without an understanding of the other programs that may be run along with it. For example, an application may be developed with the assumption that it will be running alone or only with other similar programs. This assumption may be incorrect. Thus, some applications may reflect certain coding practices that may be inappropriate for a cloud computing environment, where applications may be run concurrent with other applications that are unrelated or from other owners. For example, an application may pin to a particular process or portion of memory. However, since the application may be running in a cloud computing environment, in which other applications may be running and sharing processing resources, the request to pin to a particular location could conflict with another application running in the cloud environment. This could negatively impact the execution of the application as well as the performance and stability of the cloud environment.

In order to account for these coding practices, and the potential incompatibility of an application to the cloud computing environment, a hypervisor may be enabled to detect and handle situations which result in poor interoperability of an application with a cloud computing environment. The hypervisor could also be suited to handle requests in other processing environments, in order to handle requests that may result in poor interoperability between applications on any shared computing resource.

The system can receive a processing request from a particular application. Before the request is executed, the system can determine whether or not the request is of the type that may result in poor interoperability in the particular environment. For example, in a cloud computing environment a request may be received to pin to a particular thread. The system could determine that the request would result in poor operability of the application. The system can make this determination by comparing the received request with a list of requests that have been identified as requests that will result in poor interoperability. By way of example, this list can be predetermined, created once through the use of a particular interoperability metric, or created and updated periodically throughout processing. The requests on the list will be referred to herein as "interoperability requests".

Each interoperability request may be associated with at least one processing solution. These processing solutions can be, for example, pinning to a different "safe" thread. Another processing solution can be ignoring the request. There can also be other processing solutions. Using the interoperability request identified from the list (i.e. the interoperability request matching the received request from the application) the system can identify a particular processing solution that is associated with the request. For example, the hypervisor may identify a solution: pin to a safe thread. While the hypervisor may direct the system to perform this alternative, identified processing solution, it may do so without informing the application of the way the request is being handled. The hypervisor may determine the particular processing solution to be used to execute the request, while keeping the solution hidden from the application. Rather than being notified of the manner in which hypervisor is handling the request, the application may be told that the request has been fulfilled [as specified in the request].

Using the identified processing solution, the system can fulfill or execute the request by, rather than pinning to the particular thread which would have created processing issues, pinning to the safe thread, identified as the processing solution. Once the request has been fulfilled with the processing solution, the system can communicate with the application from which the request was received. The execution of the request can be communicated to the application. Data specific to the particular request ("interoperability data") may also be collected to be communicated with the owner of the application, at the time of execution or at a later time. The system need not communicate the processing solution that was used to execute the request, merely that the request has been fulfilled, in order to allow the application to believe that the request was executed as specified.

However, the interoperability data can include information specific to the request, including the identity of the interoperability request from the list that was triggered by the request. The interoperability data can also include a log of the number of times this particular application has triggered that interoperability request. The data can also include the solution that was used, how frequently that solution is used (relative to the frequency of the particular interoperability request), and other data relevant to the application's execution on the particular environment.

This log—of number and type of situations which trigger a processing solution based on an interoperability request match—may be communicated to the owner of the application. The relevant portion of the log may be communicated as interoperability data to the owner of the application that submitted the request following the execution of a request. The log may also be communicated in part or whole to the application owner periodically.

FIG. 1 depicts a system diagram for enabling a hypervisor to process requests from applications in a processing environment, specifically a cloud computing environment, consistent with embodiments of the present disclosure. The applications (apps) 102 may be any number or type of application which is to be run in a shared computing resource environment. For example, the apps 102 may be run in a public cloud computing environment.

The apps 102 can be run on the various cloud virtual machines (cloud VMs) 106. The various cloud VMs 106 can be managed by a hypervisor 104. The apps 102 may also be run in the cloud in another manner. Although FIG. 1 details a cloud computing environment in which the apps 102 are to be run, they may be run and managed by the hypervisor in the manner described herein in any processing environment with shared computing resources. The hypervisor can receive requests from the apps 102, handle resource allocation, and determine where and how the request should be processed. The hypervisor can also be responsible for communicating processing data to the apps 102. The hypervisor can also direct communications to the application owners, as described herein.

Figure 2:
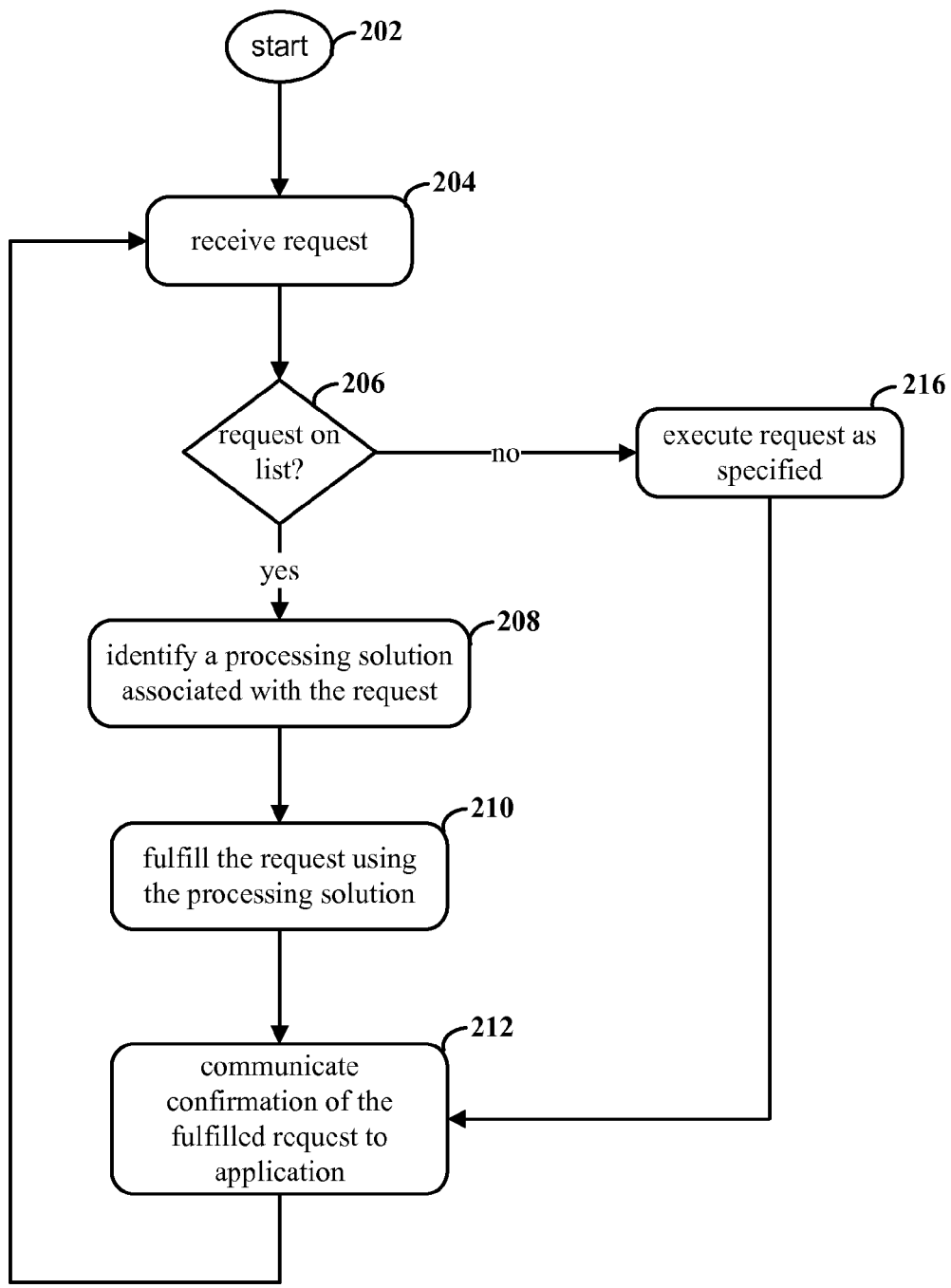
FIG. 2 depicts a method for enabling a hypervisor to handle requests from applications running in a shared computing resource environment, consistent with embodiments of the present disclosure.

FIG. 2 depicts a method for enabling a hypervisor to handle requests from applications running in a shared computing resource environment, consistent with embodiments of the present disclosure. The method may be carried out over one or more computer processing circuits. At 202, the method starts. The system receives a request at 204. This request may come from an application, as a processing call. The system can then determine at 206 if the request that has been received matches a request on a list of "interoperability requests". These interoperability requests are identified as such, as each may be a request that has been determined to result in poor interoperability between applications in the shared processing environment. The list of interoperability requests may be predetermined and provided to the hypervisor at the outset. The list may also be determined periodically, based on interoperability metrics. For example, an interoperability metric could reflect lag time in processing, likelihood of crashing, ability to destabilize the computing environment, or others, for a particular request. This metric could be based on historical data input to the system, which could then be updated throughout processing, to reflect changes in compatibility of the particular request in the processing environment.

If at 206, the request is not found on the list of interoperability requests, the system may execute the request as specified (i.e. without any modifications to the manner of processing), per 216. The hypervisor can then communicate a confirmation of the fulfilled request to the application, per 212. The hypervisor can receive a next request, per 204. The method can repeat from here.

Once the system has determined, at 206, that the request is on the list of interoperability requests, the hypervisor can identify a processing solution associated with the request, per 208. Each interoperability request on the list can be associated with one or more processing solutions. The processing solution could be one of any number of ways in which the hypervisor can fulfill the request, in light of the shared resources and the specifics of the request. For example, the hypervisor, in managing a number of incoming requests, may determine that the incoming request is a request that identifies a particular area of memory to which it is to be pinned. If the received request is on the list of interoperability requests for that particular hypervisor, an associated processing solution that involves pining the request to a different, but available location, may be identified. A processing solution might also be to ignore the request by not executing the request. For example, this processing solution could be associated with a request that is used by the application to improve the performance of the application. However, if the application is running fine in the shared environment, based on the processing as described herein, the request may be ignored.

At 210, the system may fulfill the request using the processing solution identified at 208. For example, the processing solution identified was to pin the request to another location, the system would then carry out that instruction. If, as in the above example, the processing solution is to ignore or not execute the call, the request may still be "fulfilled" by the identification of the solution (i.e. ignore) and the processing of the request (i.e. consider it fulfilled without executing any steps).

The hypervisor can then communicate a confirmation of the fulfilled request to the application, per 212. For example, if the request was fulfilled, but was pinned to a different location than that specified in the request, the hypervisor may communicate simply that the request was fulfilled. Similarly, if the request was fulfilled with an "ignore" or "do not execute" processing solution, the hypervisor can communicate to the application that the request has been fulfilled, but may not communicate directly the manner in which it was fulfilled (e.g. ignored). The communication may also include interoperability data, as described herein. Importantly, the hypervisor may communicate to the application from which the request was received, that the request has been satisfied without communicating that the processing solution was used (rather than the manner in which the request specified). In this way, the application may run without disruption, as though it were operating in its preferred environment, rather than on shared resources; it may continue to process as though the requests were being filled as demanded, rather than as actually executed.

Following the communication of a successful execution of the first request to the first application, the hypervisor can receive a second request from the first application, and the method can begin again, per 204. The hypervisor can also handle requests from multiple applications, with a first request coming from a first application and a second request coming from a second application. There may be different interoperability request lists for each application, and as described herein, the list of requests may be refined periodically.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
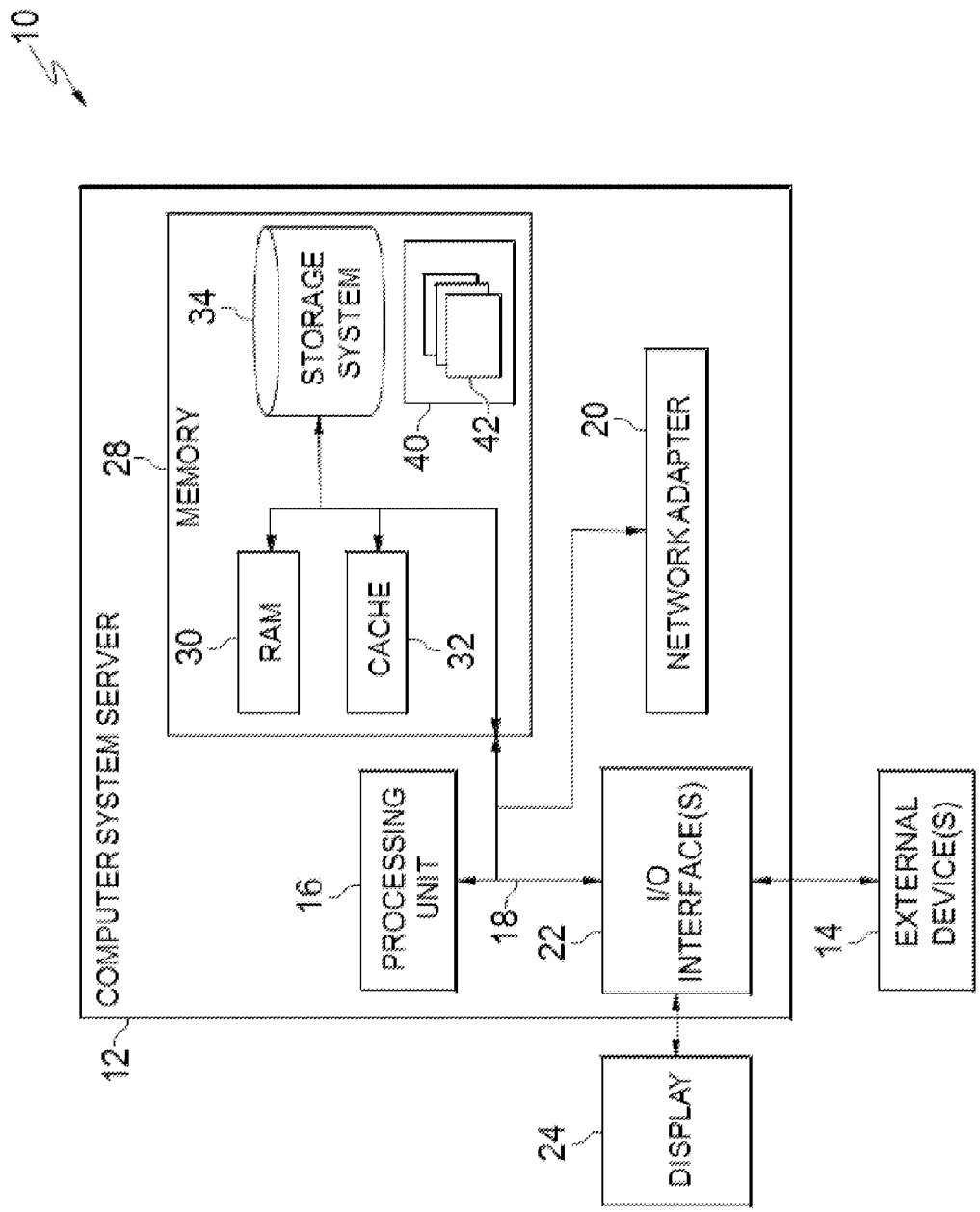
FIG. 3 depicts a cloud computing node consistent with embodiments of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
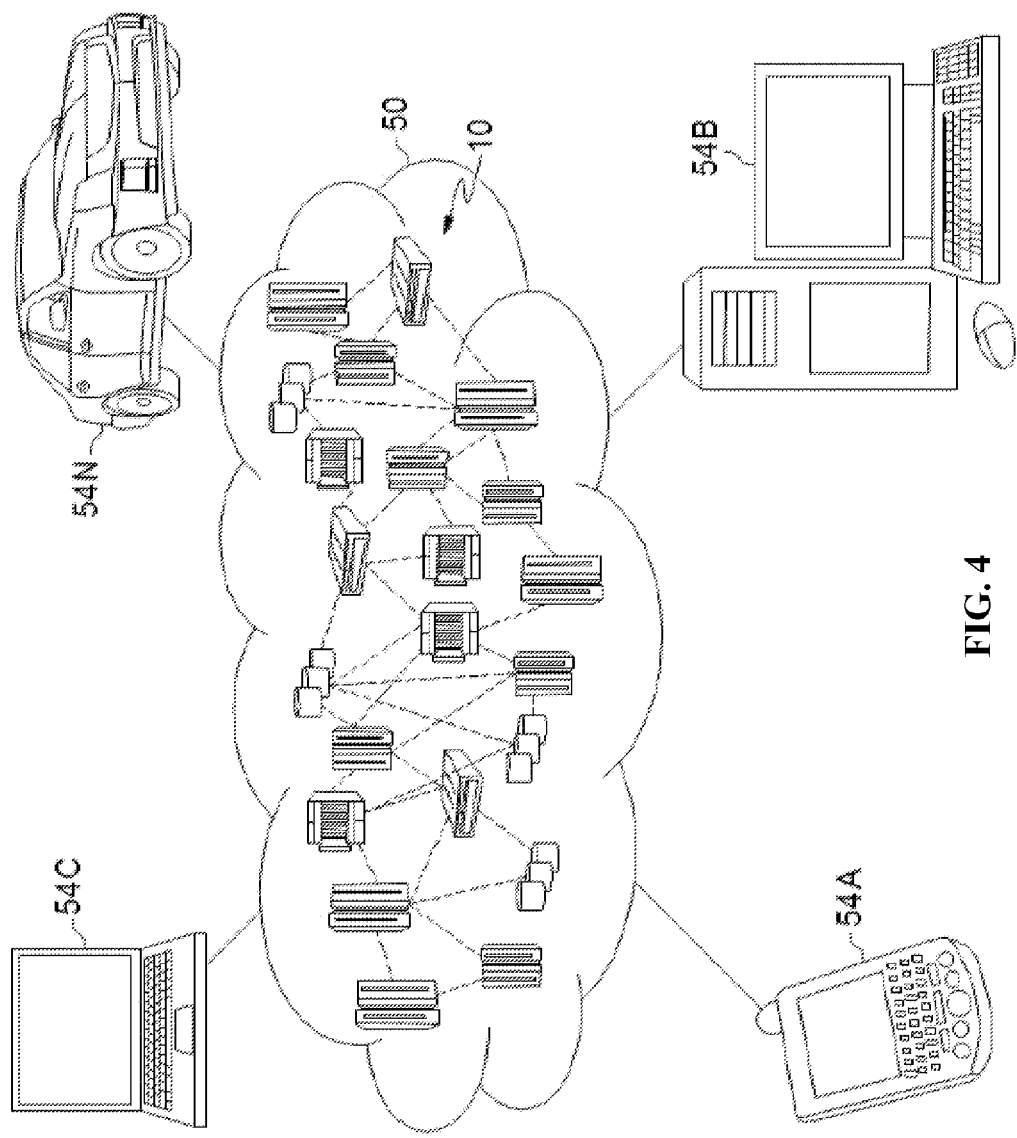
FIG. 4 depicts a cloud computing environment consistent with embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
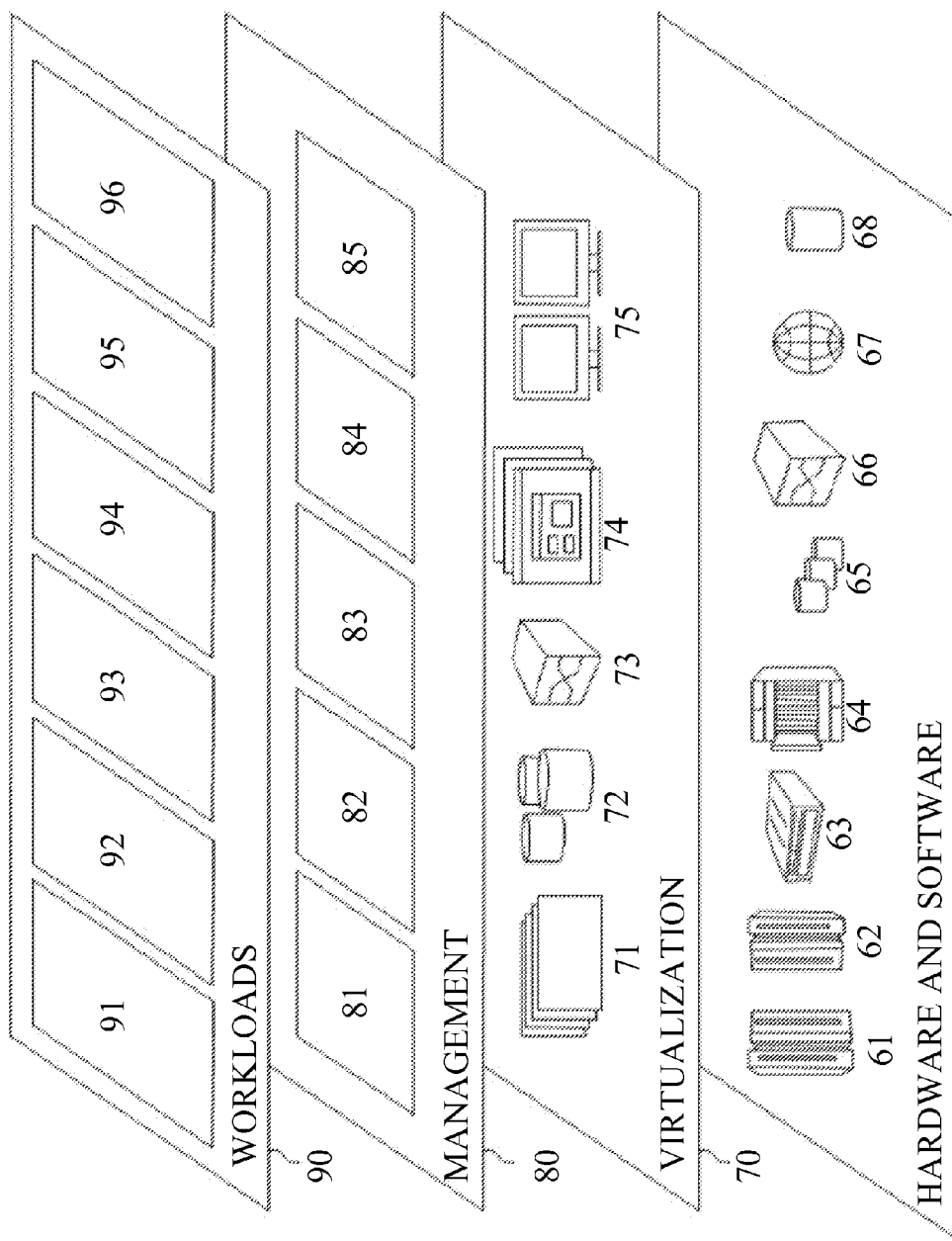
FIG. 5 depicts abstraction model layers consistent with embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. For example, resource provisioning 81 may include a hypervisor according to embodiments described herein. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and handling abbreviations modifications 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method for enabling a hypervisor to process requests from applications in a processing environment, the method comprising:
   receiving a first request from a first application;
   determining the first request matches an interoperability request from a list of interoperability requests, each interoperability request associated with at least one processing solution, and wherein the interoperability requests are requests that will result in poor operability in the processing environment;
   identifying a processing solution based on the interoperability request that matches the first request, wherein the processing solution directs where the first request is pinned;
   fulfilling the first request with the identified processing solution, and in response to the fulfilling:
   communicating a confirmation of the fulfilled first request to the first application;
   logging the first request, the interoperability request that matches the first request, and the identified processing solution;
   tracking a number of requests that match a particular interoperability request for each particular interoperability request on the list of interoperability requests over a predetermined period; and
   transmitting the number of requests that match the particular interoperability request and an identity of the particular interoperability request to an owner of the first application.

2. The method of claim 1 wherein the identified processing solution is to ignore the first request.

3. The method of claim 1 further comprising:
   receiving a second request from the first application;
   determining the second request matches as least one interoperability request from the list of interoperability requests;
   identifying another processing solution based on the interoperability request that matches the second request;
   fulfilling the second request with the identified another processing solution;
   communicating a confirmation of the fulfilled second request to the first application in response to the fulfilling.

4. The method of claim 1, wherein a set of requests, that the list of interoperability requests comprises, are determined based on an interoperability metric.

5. The method of claim 4, wherein the list of interoperability requests is refined periodically by applying the interoperability metric to the set of requests.

6. The method of claim 1, wherein the list of interoperability requests is predetermined.

7. The method of claim 1, further comprising notifying the owner of the application based on the determining the first request matches the interoperability request from the list of interoperability requests.

8. The method of claim 1, further comprising communicating interoperability data specific to the first request to the first application, the data including an identity of the first request and the identified processing solution.

9. The method of claim 1, wherein the processing environment is a shared computing resource environment.

* * * * *